United States Patent
Chen

(10) Patent No.: US 8,797,752 B2
(45) Date of Patent: Aug. 5, 2014

(54) CONNECTING MEMBER FOR PORTABLE ELECTRONIC DEVICE

(75) Inventor: Jian-Hui Chen, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 188 days.

(21) Appl. No.: 13/213,455

(22) Filed: Aug. 19, 2011

(65) Prior Publication Data
US 2012/0182707 A1 Jul. 19, 2012

(30) Foreign Application Priority Data
Jan. 19, 2011 (CN) .......................... 2011 1 0021442

(51) Int. Cl.
| H05K 1/14 | (2006.01) |
| H05K 7/10 | (2006.01) |
| H05K 7/12 | (2006.01) |
| H05K 5/00 | (2006.01) |
| H05K 7/00 | (2006.01) |
| H05K 1/00 | (2006.01) |
| H05K 1/18 | (2006.01) |
| H05K 1/11 | (2006.01) |
| H05K 7/02 | (2006.01) |
| H05K 7/04 | (2006.01) |
| F16D 1/00 | (2006.01) |

(52) U.S. Cl.
USPC ........... 361/758; 361/742; 361/770; 361/804; 361/810; 361/807; 361/752; 361/759; 361/756; 361/728; 361/736; 361/747; 361/748; 361/679.01; 403/408.1

(58) Field of Classification Search
CPC ....... H05K 1/144; H05K 1/142; H05K 7/142; H05K 7/1417; G06F 1/184
USPC ......... 361/807, 804, 810, 742, 758, 770, 752, 361/759, 756, 728, 736, 747, 748, 679.01; 403/408.1
See application file for complete search history.

(56) References Cited

U.S. PATENT DOCUMENTS

| 3,611,861 | A | * | 10/1971 | Schulze | ......................... | 411/508 |
| 6,104,614 | A | * | 8/2000 | Chou et al. | .................... | 361/704 |
| 6,409,446 | B1 | * | 6/2002 | Schwarz | ....................... | 411/552 |
| 6,988,863 | B2 | * | 1/2006 | Hulin et al. | .................... | 411/553 |

* cited by examiner

*Primary Examiner* — Anthony Haughton
*Assistant Examiner* — Zhengfu Feng
(74) *Attorney, Agent, or Firm* — Novak Druce Connolly Bove + Quigg LLP

(57) ABSTRACT

A connecting member for a portable electronic device includes a central cylinder, a first flange portion, a second flange portion, a plurality of first clasps and a number of second clasps. The first flange portion and the second flange portion surround on the central cylinder. The first clasps extend from the first flange portion, and the second clasps extend from the second flange portion.

5 Claims, 6 Drawing Sheets

CONNECTING MEMBER FOR PORTABLE ELECTRONIC DEVICE

BACKGROUND

1. Technical Field

The present disclosure relates to connecting structures, and particularly to a connecting member for portable electronic devices.

2. Description of Related Art

Portable electronic devices are generally a combination of components or parts such as a cover, a main housing, a printed circuit board and so on, all screwed together. The assembly process, and particularly the use of screws, is troublesome. While the screws are usually made of metal, the housing and the cover are commonly made of plastic, and so the engagement between the dissimilar materials is not very secure or long lasting.

Therefore, there is room for improvement within the art.

BRIEF DESCRIPTION OF THE DRAWING

Many aspects of the connecting member can be better understood with reference to the following drawings. The components in the drawings are not necessarily drawn to scale, the emphasis instead being placed upon clearly illustrating the principles of the connecting member. Moreover, in the drawings, like reference numerals designate corresponding parts throughout the several views.

DETAILED DESCRIPTION

Figure 1:
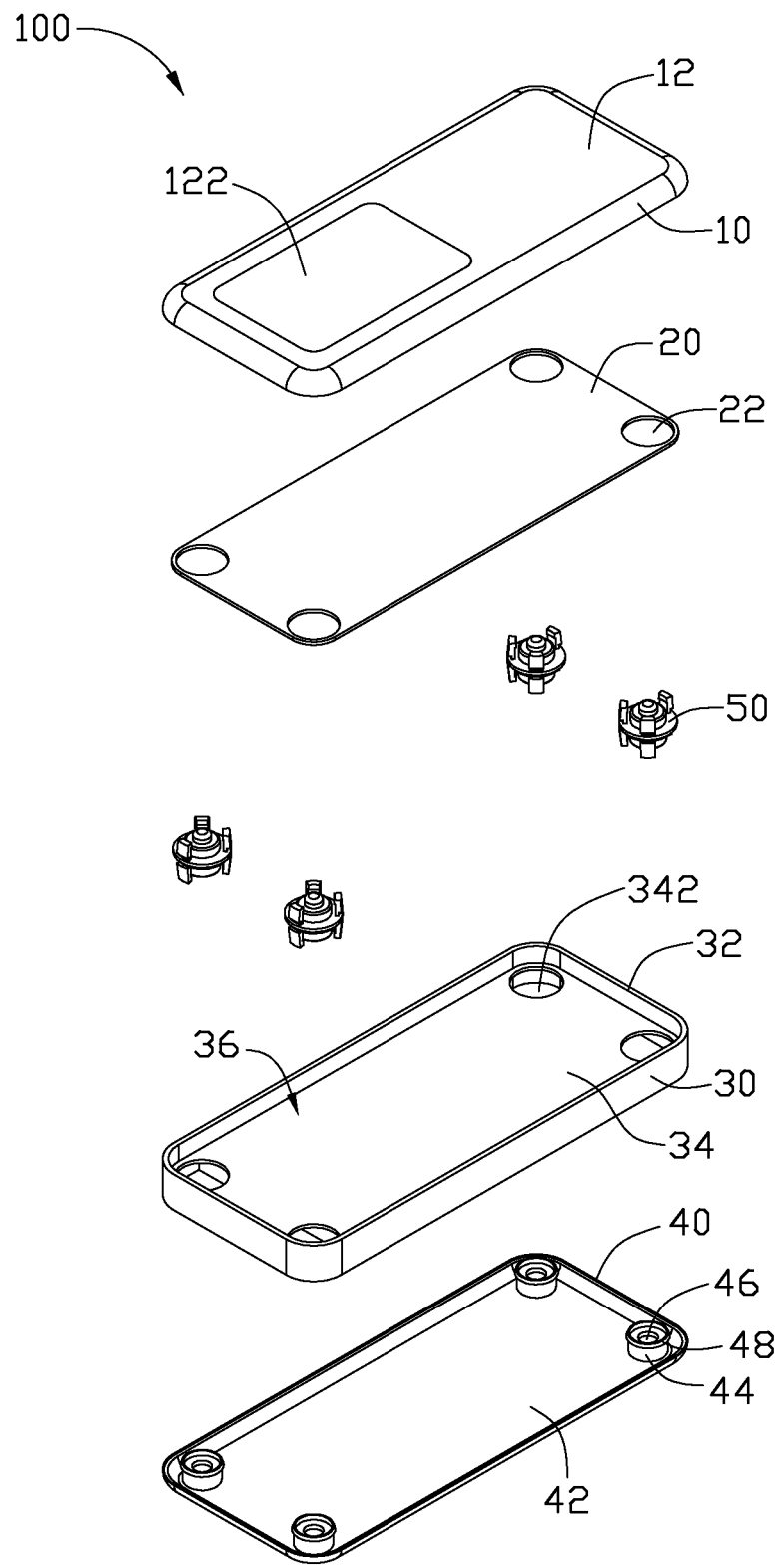
FIG. 1 is an exploded view of a portable electronic device according to an exemplary embodiment.
Figure 2:
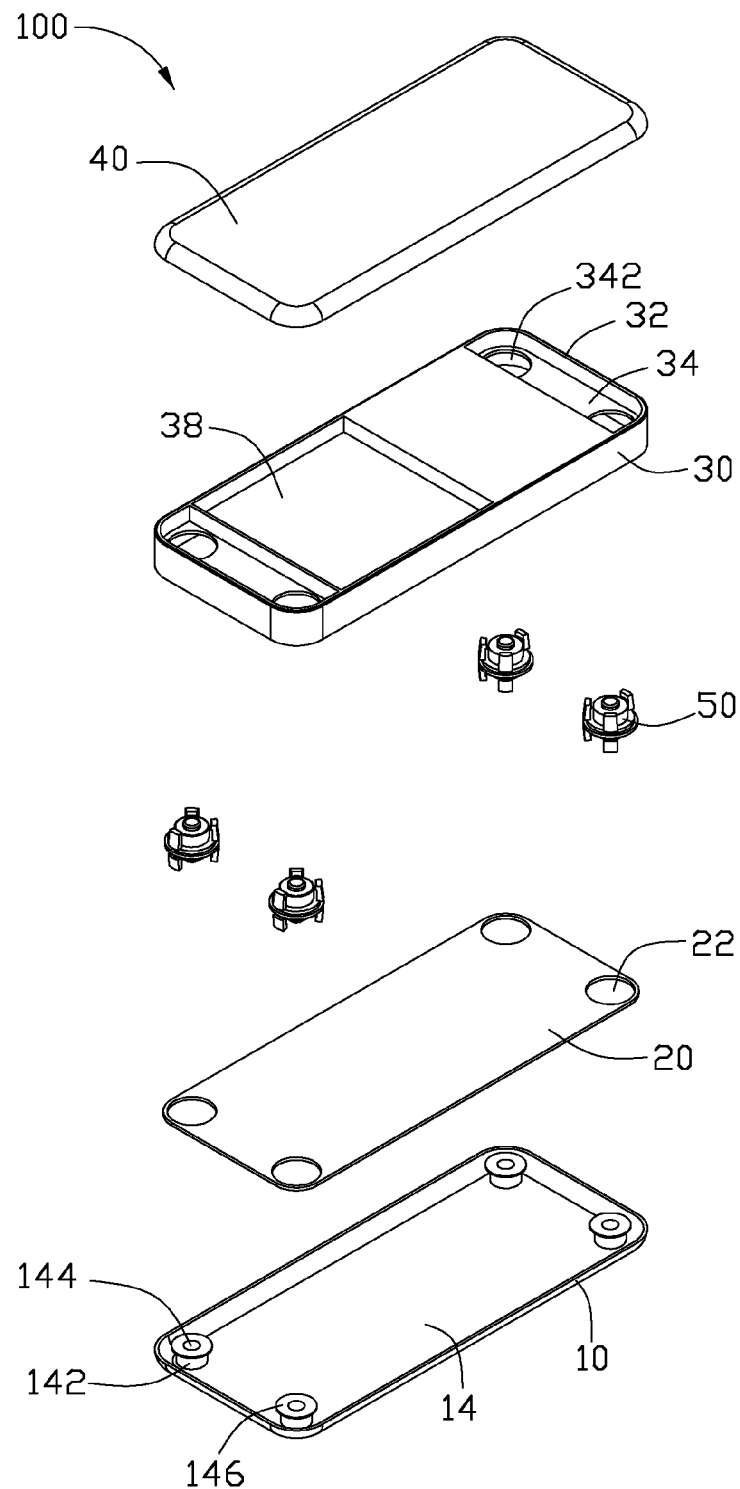
FIG. 2 is similar to FIG. 1, showing another aspect.

FIGS. 1 and 2 show a portable electronic device 100 including a plurality of connecting members 50. The device 100 includes an upper housing 10, a printed circuit board 20, a main body 30, a lower housing 40 and the connecting members 50. The upper housing 10 and the lower housing 40 are respectively attached to two sides of the main body 30. The connecting members 50 are used to fix the upper housing 10, the printed circuit board 20, the main body 30, and the lower housing 40 together. In this exemplary embodiment, there are four connecting members 50.

The upper housing 10 is substantially rectangular, and includes a first surface 12 and an opposite second surface 14. A display 122 is formed on the first surface 12. Four positioning posts 142 are respectively formed at or near the four corners of the second surface 14. Each positioning post 142 defines a receiving hole 144, and a distal end of each positioning post 142 has a flange 146 opposite to the second surface 14.

The board 20 defines four through holes 22. When the board 20 is engaged with the upper housing 10, the through holes 22 are aligned with the receiving holes 144.

The body 30 can accommodate components of the device 100. The main body 30 includes a frame 32 and a partition 34 connected to an inner peripheral wall of the frame 32. A receiving cavity 36 is defined at one side of the partition 34, and a battery compartment 38 is defined at another side thereof. The partition 34 defines four holes 342. When the board 20 is received in the receiving cavity 36, the holes 342 are aligned with the through holes 22.

The lower housing 40 covers the battery cavity 38. The lower housing 40 includes a wall 42. Four columns 44 are formed on four corners of the wall 42. Each column 44 defines a stepped hole 46. A distal end of each column 44 has a hook 48.

Figure 3:
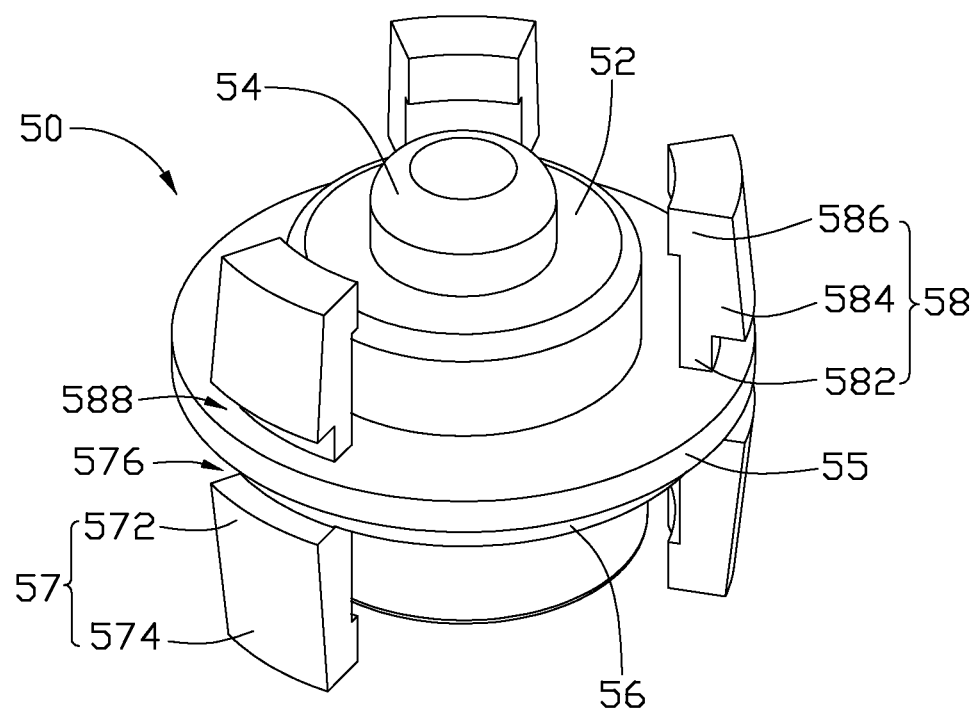
FIG. 3 is an enlarged view of a connecting member of FIG. 1.
Figure 4:
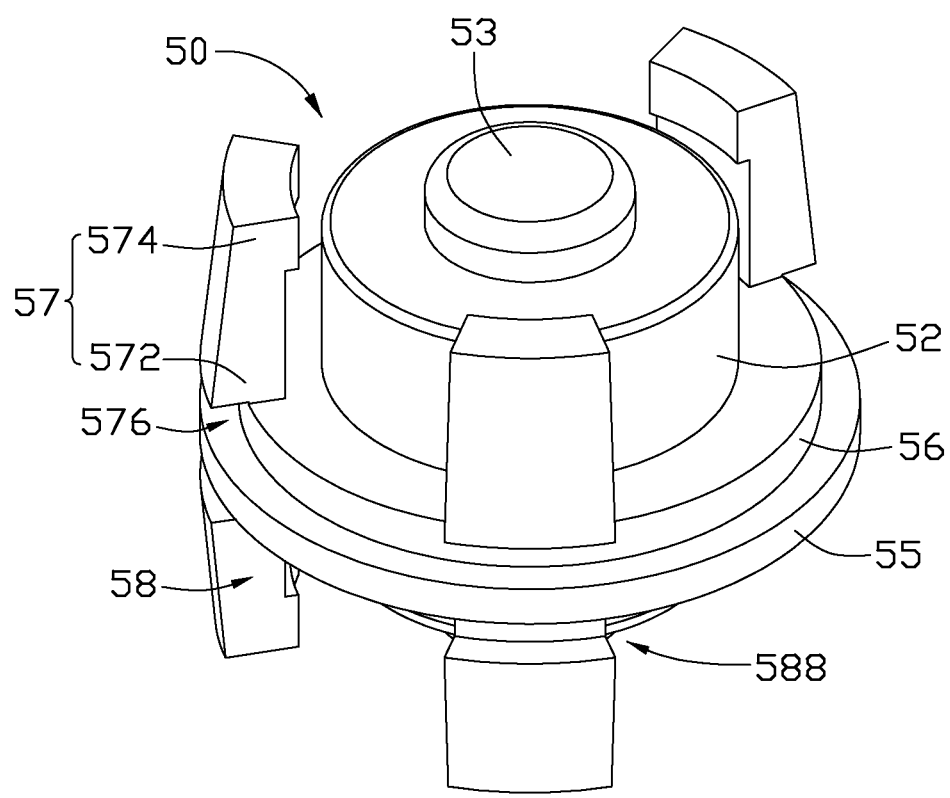
FIG. 4 is similar to FIG. 3, showing another aspect.

Referring to FIGS. 3 and 4, each connecting member 50 is made of plastic, and can be formed by injection molding. Each connecting member 50 includes a central cylinder 52. A first cylindrical protrusion 53 and a second cylindrical protrusion 54 are formed at opposite ends of the central cylinder 52. The first cylindrical protrusion 53 latches in a corresponding receiving hole 144, and the second cylindrical protrusion 54 latches in a corresponding stepped hole 46. A first flange portion 56 and a second flange portion 55 are formed at approximately the middle of and coaxial with the central cylinder 52.

A plurality of first clasps 57 extends from the first flange portion 56, and a plurality of second clasps 58 extends from the second flange portion 55. Each first clasp 57 is respectively aligned opposite one of the second clasps 58. In this exemplary embodiment, there are three each of the first and second clasps 57, 58. Each first clasp 57 includes a holding portion 572 and a clasped portion 574 and integrally formed together. The holding portion 572 extends from a brim of the first flange portion 56. A gap 576 is defined between the holding portion 572, the first flange portion 55 and the second flange portion 56 for holding the board 20. Each second clasp 58 includes a narrow portion 582, a support portion 584, and a clamping portion 586. The narrow portion 582 extends from the second flange portion 55. The support portion 584 is wider than the narrow portion 582, thereby defining a clearance 588 therebetween for latching with the partition 34. The clamping portion 586 is configured for latching with the hook 48.

Figure 5:
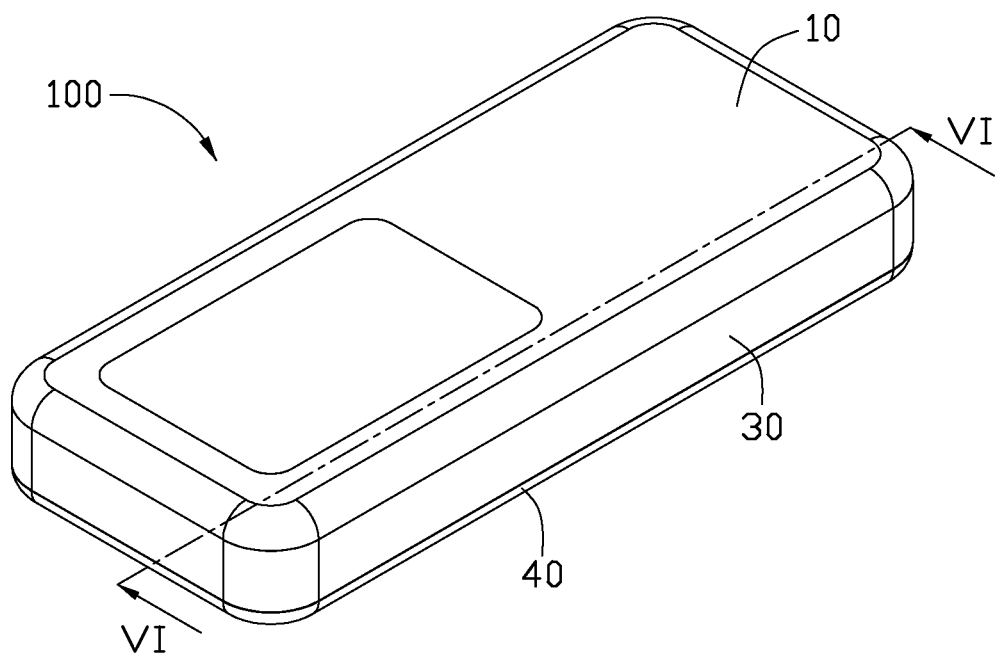
FIG. 5 is an assembled isometric view of the portable electronic device shown in FIG. 1.
Figure 6:
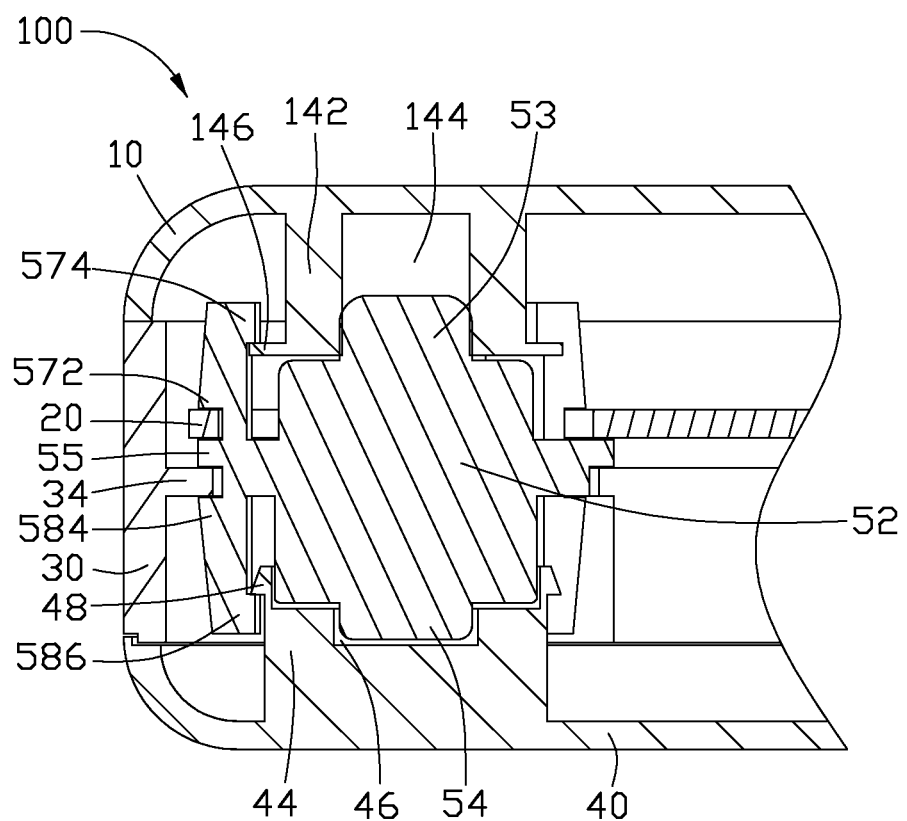
FIG. 6 is a cross sectional view of the portable electronic device taken along line VI-VI of FIG. 5.

FIGS. 5 and 6 show an assembled device 100. The following will illustrate one connecting member as an example. When assembled, the central cylinder 52 extends through the hole 342. The partition 34 latches in the clearance 588. Then, the board 20 is placed on the main body 30, and the central cylinder 52 extends through the through holes 22 to allow the board 20 to be latched in the gap 576. After that, the upper housing 10 is placed to cover the receiving cavity 36. The first cylindrical protrusion 53 is received in the receiving hole 144, and the clasping portions 574 clasp the flange 146 of the positioning post 142. Finally, the lower housing 40 is placed to cover the other side of the main body 30. The second cylindrical protrusion 54 is received in the stepped hole 46 and the clamping portions 586 are latched by the hooks 48. The assembling process of the other connecting members is similar to the above connecting member 50, and thus is not detailed. The assembly process is easy and convenient.

It is to be understood, however, that even through numerous characteristics and advantages of exemplary embodiments have been set forth in the foregoing description, together with details of the structure and function of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A portable electronic device, comprising:

an upper housing including a plurality of positioning posts;

a printed circuit board defining a plurality of first through holes aligned with the positioning posts;

a main body defining a plurality of second through holes aligned with the first through holes;

a lower housing including a plurality of columns;

a plurality of connecting members; each connecting member comprising:

a central cylinder extending through the first holes and the second holes;

a first flange portion and a second flange portion surrounding on the central cylinder, the first flange portion and the second flange portion contacting each other, and being integral with the central cylinder;

a plurality of first clasps extending from the first flange portion toward one end of the central cylinder, the first clasps latching the positioning posts of the upper housing; and a plurality of second clasps extending from the second flange portion toward an opposite end of the central cylinder, each first clasp respectively aligned opposite one of the second clasps, the second clasps latching the columns of the lower housing, the first flange portion and the first clasps latching the printed circuit board, and the first flange portion and the second clasps latching the main body.

2. The portable electronic device as claimed in claim 1, further comprising a first cylindrical protrusion and a second cylindrical protrusion, wherein the first cylindrical protrusion and the second cylindrical protrusion are formed at opposite ends of the central cylinder, the first clasps surround the first cylindrical protrusion and the second clasps surround the second cylindrical protrusion.

3. The portable electronic device as claimed in claim 2, wherein the first flange portion and the second flange portion surround at an approximately middle of the central cylinder, the first flange portion and the second flange portion are ring-shaped, and have different diameters.

4. The portable electronic device as claimed in claim 3, wherein the first clasps are arranged along a peripheral edge of the first flange portion, each first clasp includes a holding portion and a clasped portion and integrally formed together, and the holding portion extends from a brim of the first flange portion, a gap is defined between the holding portion, the first flange portion and the second flange portion, the gap holding the printed circuit board.

5. The portable electronic device as claimed in claim 4, wherein the second clasps are arranged along a peripheral edge of the second flange portion, each second clasp includes a narrow portion, a support portion and a clamping portion, the narrow portion extends from the second flange portion, the support portion is wider than the narrow portion, thereby defining a clearance, the main body includes a partition received in the clearance.

* * * * *